United States Patent [19]

Knudson, Jr. et al.

[11] Patent Number: 5,110,501
[45] Date of Patent: * May 5, 1992

[54] PROCESS FOR MANUFACTURING ORGANOCLAYS HAVING ENHANCED GELLING PROPERTIES

[75] Inventors: Milburn I. Knudson, Jr., Gonzales, Tex.; Thomas R. Jones, Cornwall, England

[73] Assignee: Southern Clay Products, Inc., Gonzales, Tex.

[*] Notice: The portion of the term of this patent subsequent to May 12, 2004 has been disclaimed.

[21] Appl. No.: 219,831

[22] Filed: Jul. 7, 1988

Related U.S. Application Data

[63] Continuation of Ser. No. 828,044, Feb. 10, 1986, abandoned, which is a continuation-in-part of Ser. No. 771,477, Sep. 3, 1985, Pat. No. 4,664,842, which is a continuation-in-part of Ser. No. 551,957, Nov. 15, 1983, Pat. No. 4,569,923, which is a continuation-in-part of Ser. No. 561,052, Dec. 13, 1983, abandoned, which is a continuation-in-part of Ser. No. 193,636, Oct. 3, 1980, abandoned, which is a continuation-in-part of Ser. No. 393,600, Jun. 30, 1982, abandoned, which is a continuation of Ser. No. 193,635, Oct. 3, 1980, abandoned.

[51] Int. Cl.$^5$ .......................... B01J 13/00; C07F 5/06
[52] U.S. Cl. .................................. 252/315.2; 44/270; 106/487; 252/28; 501/148; 556/173
[58] Field of Search ................ 252/315.2, 28; 44/270; 501/145–150; 106/487; 556/173

[56] References Cited

U.S. PATENT DOCUMENTS

| | | | |
|---|---|---|---|
| 2,739,067 | 3/1956 | Ratcliffe | 106/32 X |
| 3,433,704 | 3/1969 | Hecklau et al. | 501/147 X |
| 3,574,345 | 4/1971 | Brociner | 366/6 |
| 3,951,850 | 4/1976 | Clocker et al. | 252/313.1 |
| 4,040,974 | 8/1977 | Wright et al. | 252/315.2 |
| 4,105,578 | 8/1978 | Finlayson et al. | 252/315.2 |
| 4,116,866 | 9/1978 | Finlayson | 252/315.2 |
| 4,193,806 | 3/1980 | Finlayson | 106/22 X |
| 4,208,218 | 6/1980 | Finlayson | 252/315.2 X |
| 4,216,135 | 8/1980 | Finlayson | 252/315.2 X |
| 4,240,951 | 12/1980 | Moll, Jr. et al. | 106/487 X |
| 4,365,030 | 12/1982 | Oswald et al. | 523/521 X |
| 4,371,626 | 2/1983 | Hentz | 501/145 |
| 4,469,639 | 9/1984 | Thompson, III et al. | 556/173 |
| 4,569,923 | 2/1986 | Knudson, Jr. et al. | 501/148 |
| 4,664,842 | 5/1987 | Knudson, Jr. et al. | 252/28 X |

FOREIGN PATENT DOCUMENTS 1439828 6/1976 United Kingdom .

OTHER PUBLICATIONS

"Chemical Engineers' Handbook," Edited by R. H. Perry et al., 5th Edition, 1973, McGraw-Hill Book Co., pp. 8–16, 8–29, 8–30, 8–42 and 8–43.

*Primary Examiner*—Richard D. Lovering
*Attorney, Agent, or Firm*—Klauber & Jackson

[57] ABSTRACT

In the process for preparing an organoclay by reacting a smectite-type clay with a higher alkyl-containing quaternary ammonium compound, the gelling properties of the organoclay are enhanced by reducing the average particle size of the clay prior to the reaction thereof with the quaternary ammonium compound.

3 Claims, 7 Drawing Sheets

EFFECT OF TREATMENT OF REFINED BENTONITE SLURRY BY INVENTION. VISCOSITY MEASURED IN DIESEL FUEL GEL.

FIG. 4

EFFECT OF TREATMENT OF REFINED BENTONITE SLURRY BY INVENTION. VISCOSITY MEASURED IN ODORLESS MINERAL SPIRIT.

FIG. 3

EFFECT OF TREATMENT OF REFINED BENTONITE SLURRY BY INVENTION. VISCOSITY MEASURED IN TOLUENE GEL.

FIG. 5 EFFECT OF TREATMENT OF REFINED BENTONITE BY INVENTION. VISCOSITY MEASURED IN TOLUENE GEL.

FIG. 6 EFFECT OF TREATMENT OF REFINED BENTONITE SLURRY BY A ROTOR/STATOR MIXER. VISCOSITY MEASURED IN DIESEL FUEL.

FIG. 7 EFFECT OF TREATMENT OF REFINED BENTONITE SLURRY BY A ROTOR/STATOR MIXER. VISCOSITY MEASURED IN ODORLESS MINERAL SPIRIT.

PROCESS FOR MANUFACTURING ORGANOCLAYS HAVING ENHANCED GELLING PROPERTIES

This application is a continuation of our copending application Ser. No. 828,044, filed Feb. 10, 1986, now abandoned. The latter is a continuation-in-part of our applications Ser. No. 771,477, filed Sep. 3, 1985, now U.S. Pat. No. 4,664,842; and of Ser. No. 551,957, filed Nov. 15, 1983, now U.S. Pat. No. 4,569,923. The former is a continuation of Ser. No. 561,052, filed Oct. 13, 1983, which is a continuation of Ser. No. 193,636, filed Dec. 3, 1980. The latter is a continuation-in-part of Ser. No. 393,600, filed Jun. 30, 1982, which was a continuation of Ser. No. 193,635, filed Oct. 3, 1980. Ser. Nos. 561,052; 193,636; 393,600; and 193,635 are all now abandoned.

BACKGROUND OF INVENTION

This invention relates generally to organophilic clays (hereinafter referred to as "organoclays"), and more specifically relates to an improved process for manufacture of same, which process strikingly enhances the gelling properties of the said products.

Organoclays, representing the reaction product of a smectite-type clay with a higher alkyl-containing quaternary ammonium compound, have long been known for use in gelling of organic liquids such as lubricating oils, linseed oil, toluene and the like. A large variety of highly useful products, such as lubricating greases are producible through use of such gelling agents. The procedures and chemical reactions pursuant to which these organoclays are prepared, are well-known. Thus, under appropriate conditions, the organic compound which contains a cation, will react by ion exchange with clays which contain a negative layer lattice and exchangeable cations to form the organoclay products. If the organic cation contains at least one alkyl group containing at least 10 carbon atoms, then the resultant organoclays will have the property of swelling in certain organic liquids.

Among the prior art patents which discuss at length aspects of the preparation and properties of organoclays, as above outlined, are U.S. Pat. Nos. 2,531,427; 2,966,506; 3,974,125; 3,537,994; and 4,081,496. Reference may also be had to applicable portions of the standard reference work "Clay Mineralogy", 2nd Edition, 1968, by Ralph E. Grim, McGraw Hill Book Company.

In the usual procedure for preparing an organophilic clay pursuant to this prior art, the smectite-type clay, selected quaternary compound and water are mixed together, preferably at an elevated temperature, typically in the range of 100° F. to 180° F., for a period of time sufficient for the organic quaternary ammonium compound to coat the clay particles. Thereafter, the product can be filtered, washed, dried and ground, or otherwise processed, depending upon the intended use. In some instances, e.g., the drying and grinding step may be omitted. Various other modifications of this process may be used depending upon the form of product desired—as will be noted in the referenced patents.

SUMMARY OF INVENTION

Now in accordance with the present invention, it has unexpectedly been discovered that the known process for manufacture of an organoclay, wherein a smectite-type clay is reacted with a higher alkyl-containing quaternary ammonium compound, may be improved to yield striking enhancement of the gelling properties of the resultant organoclay product, by reducing the average particle size present in the clay which is to be reacted with the quaternary amine by use of means which act to increase the ratio of dispersed clay platelets to aggregated clay platelets present in the said clay.

The invention is more generally applicable to the process for manufacture of an organoclay by the conventional steps of (a) dispersing in water a crude smectite-type clay which initially includes aggregates of clay platelets, to form a low solids slurry including dispersed and aggregated clay platelets in a weight ratio A; (b) removing from the slurry non-clay and abrasive components; (c) separating from the slurry a substantially less than 4 micron particle size fraction having a weight ratio of dispersed to aggregate platelets of B, where $B > A$; and (d) reacting the clay product from step (c) in its predominantly sodium smectite form with a higher alkyl-containing quaternary ammonium compound to produce the organoclay.

Pursuant to the invention, enhancement of the gelling properties of the organoclay is enabled by subjecting the smectite-type clay at a processing point prior to step (d), to an average particle size reduction step, which increases the ratio of dispersed clay platelets to aggregated clay platelets present in the clay product reacted in step (d) to a value C, where C is greater than B.

In one aspect of the invention, the average particle size reduction step is effected by subjecting the clay to shearing forces which liberate substantial additional quantities of the aggregated platelets. Thus, the clay can be subjected as a pumpable slurry, to high speed fluid shear prior to step (d) by passing the slurry through a narrow gap across which a pressure differential is maintained. Or the average particle size reduction step can be effected by subjecting the clay at an earlier point in the processing thereof to high energy pugmilling, by passing the clay while moist through a pugmill which imparts at least 20 HP-hrs/ton of energy to the moist clay.

The average particle size reduction can also be effected by subjecting the clay product of step (c) to centrifuging to remove additional aggregates. Commonly, step (c) has already included a conventional centrifuging step, and the additional centrifuging is effected after first reducing the solids content of the slurry fraction from the initial centrifuging to facilitate separation of further aggregates.

Although somewhat less effective in the invention, the average particle size reduction step can also be effected by media grinding of the clay in a media mill, such as by sand grinding.

High energy pugmilling is preferably effected by extruding the clay at 25 to 40 weight percent moisture content, through a pugmill which imparts at least 20 HP-hr/ton dry clay of energy to the clay.

While we are aware of cursory reference in U.S. Pat. Nos. 4,081,496 and 4,116,866 to use of a pug mill or extruder for shearing an aqueous clay slurry, in order to facilitate a reaction wherein a bentonite-type clay is to be converted to sodium form, by reaction with a soluble sodium compound, we are not aware of any use of high speed fluid shear, pugmilling, or of the other methods of the invention, for treating the clay prior to reaction with a quaternary amine, for improving the gelling properties of the resultant organoclay.

The high speed fluid shear to which the smectite-type clay is subjected in accordance with one aspect of the process of this invention, is effected by passing the pumpable slurry through a dispersion or colloid mill, which devices are often referred to in the art as "homogenizers". Dispersion and colloid mills are thus well-known in the art, and are succinctly discussed and characterized at pages 8-42 and 8-43 of "Chemical Engineers Handbook", edited by R.H. Perry and C.H. Chilton, 5th Edition, 1973, McGraw Hill Book Company (New York). As is pointed out in this standard reference work, this type of device constitutes a special class of mills normally employed for dispersion and colloidal operations. Such mills operate on a principle of high speed fluid shear. Preferred mills for use in the invention are characterized by including or defining a narrow gap across which a pressure differential is maintained and through which in accordance with the invention the pumpable slurry is passed.

Preferably, the high speed fluid shear is effected b passing the slurry at high velocities through a narrow gap, across which a high pressure differential is maintained. This type of action, e.g., can be effected in the well-known Manton-Gaulin mill, which device is sometimes referred to as the "Gaulin homogenizer". In the basic operation of such device, a reciprocating, positive displacement piston-type pump is provided with a homogenizing valve assembly which is affixed to the pump discharge. The unhomogenized product enters the valve area at high pressure and low velocity. As it passes through a narrow orifice at the valve, (which is a close-clearance area between the valve and valve seat), its velocity is increased to levels approaching sonic. This provides high shear forces for reduction, and in the said device, these forces are further implemented as this high velocity stream strikes an impact ring where its direction is changed. Of further interest in this connection, is U.S. Pat. No. 3,348,778, to M. I. Chin et al, which discloses the use of a Manton-Gaulin type arrangement for treating kaolin clays in order to improve the rheology of a clay-water system subsequently formed from same. For present purposes, the patent is of interest in disclosing certain useful arrangements for the said mill, and further details of the construction of same. The patent also discusses the gap provided in the mills of the type disclosed, and properly observes that such gap is only a fraction of an inch, usually of the order of 0.001 to 0.005 inch, but under certain conditions may be as large as 0.09 inch or even 0.1 inch.

In those instances where a gap arrangement, as in the Manton-Gaulin mill, is utilized, the said pressure differential across the gap is preferably in the range of from 1000 to 8000 psig. with 4,000 to 6,000 psig. being more typical in representative operations. Depending upon the specifics of the equipment, pressures higher than 8,000 psig. can readily be used.

The said slurry will typically include less than 25% by weight of solids; however, the solids content can vary, and be above the indicated level if appropriate dispersing agents are present. The principal requirement is that the slurry indeed be pumpable, so that it is capable of being subjected to the aforementioned high speed fluid shear.

In addition to the passage through a narrow gap, as in the aforementioned type Manton-Gaulin mill, the high speed fluid shear can also be effected, pursuant to the invention, by use of dispersion and colloid mills based upon a stator and a closely spaced rotor, wherein a high speed rotation is maintained between the two said elements. The slurry in this instance is subjected to the high speed fluid shear by being passed through the gap between the stator and the rotor. The well-known Greer mill is one example of this type of construction, and may be utilized as one intrumentality in practice of the invention. In the said Greer mill a narrow gap is defined by a stationary stator and a rotor which rotates within the vertically surrounding stator. The slurry to be treated in accordance with the invention is passed through that gap under pressure.

Further instrumentalities useful in effecting high speed fluid shear are discussed in the aforementioned reference to Perry and Chilton.

Where the smectite-type clay is subjected in accordance with the process of this invention, to high energy pugmilling, this is preferably effected by passing the smectite-type clay through a pugmill of the type disclosed in U.S. Pat. No. 3,574,345. Such device includes a barrel, a motor driven screw mounted in the barrel, and apertured plates at the tapered output end of the barrel from which the material worked in the pugmill is extruded. The said pugmill differs especially from conventional pugmills in having an L/D ratio of from 4:1 to 10:1, where L is the effective length of the screw or auger in the barrel of the pugmill, and D is the internal diameter of the portion of the barrel containing the screw.

It is preferable in accordance with the invention, to impart at least 40 to 50 HP-hr energy per ton of dry clay to the material passing through the pugmill. Higher levels of energy may also be usefully imparted, although this may require multiple passes through the pugmill.

The precise manner in which the high energy treatment in accordance with the invention acts to enable the remarkable improvements in gelling properties is not fully understood. Among other things, however, it has been found that such treatment has a marked effect on the average particle size of the clay. It, thus, has been determined that where a bentonite-type feed sample having an average particle size of 0.756 microns is passed through a Manton-Gaulin mill where the energy input was 210 HP-hours per ton of clay, the average particle size was reduced to 0.438 micrometers. In a second instance, the average particle size of the clay was reduced from 0.756 micrometers to 0.352 micrometers when the energy input was 700 horsepower hours per ton of clay. Similar reductions in average particle size are achieved when the clay is passed through a pugmill of the type above described. Thus, for example, when a smectite-type clay having an average particle size of 0.475 micrometers is passed through such a pugmill and approximately 30 HP-hr/ton clay of energy is dissipated therein, the average particle size is reduced to 0.391 micrometers. At energy dissipation levels of 51 and 108 HP-hr/ton, a feed clay having an average particle size of 0.756 micrometers is so changed that the particle size is reduced to 0.277 and 0.276 micrometers, respectively. This data indicates a very substantial average particle size reduction, and is one consequence of the treatment of the clay. (These data are weight average particle size of the bentonite dispersed in water, as measured on a "Nanosizer" apparatus marketed by Coulter).

The smectite-type clays which are subjected to the improved process of this invention, are precisely those which have been conventionally utilized in the prior art in the preparation of organoclays as aforementioned.

These are smectite-type clays which have a cation exchange capacity of at least 75 milliequivalents per 100 grams of clay. Useful clays for such purposes include the naturally occurring Wyoming variety of swelling bentonite and similar clays, and hectorite, which is a swelling magnesium-lithium silicate clay. The clays are preferably converted to the sodium form if they are not already in this form. This can be effected, again as is known in the art, by a cation exchange reaction, or the clay can be converted via an aqueous reaction with a soluble sodium compound.

Smectite-type clays prepared synthetically can also be utilized, such as montmorillonite, hentonite, beidelite, hectorite-saponite, and stevensite.

In a typical procedure pursuant to the invention, the crude smectite-type clay, as for example a bentonite, is initially dispersed in water at relatively low solids, typically at less than 10% by weight. The slurry is then screened and centrifuged to remove non-clay components and especially abrasive elements such as quartz. Removal of these abrasive elements is especially preferred if the slurry is thereupon to be subjected to shearing forces as by passing through a narrow gap as in the Manton-Gaulin mill. Were such abrasives present, the orifice channel and attendant portions of the mill would rapidly become damaged.

The fine fraction from the centrifuge, which typically is a sub-4 micron cut and includes 4 to 5% solids, is then subjected to high speed fluid shear in accordance with the invention. Typically, as aforementioned, the said slurry may be passed through a Manton-Gaulin homogenizer in which pressures of 1000 to 8000 psig. are maintained across the gap, and pressures of 4000 to 6000 psig. are typical. The output clay product from the high speed fluid shear step is then subjected to the conventional reaction with the quaternary amine.

Where media grinding is used to reduce the average particle size, it is similarly the sub-4 micron cut from the centrifuge, typically including 4 to 5% solids, which is subjected to e.g. sand grinding. The resultant product is then subjected to the conventional amine reaction.

Where high energy pugmilling is used, the crude smectite-type clay is adjusted with water to approximately 60.0 to 75.0% solids. The crude is then passed through a pugmill under conditions which impart at least 40 to 50 HP-hr energy per ton of dry clay. In the event the crude is not a sodium clay, sodium carbonate may be added during the pugmilling process to produce a sodium bentonite. The clay is then dispersed in water at relatively low solids, typically at less than 10% by weight. The slurry is then screened and centrifuged to remove non-clay components and especially abrasive elements such as quartz. The centrifuge is preferably set to recover a less than 4 micron cut, as is usual in preparing the clay for the organic reaction. The fine fraction from the centrifuge is then subjected to the conventional reaction with the quaternary amine.

In a further procedure pursuant to the invention, the crude smectite clay is dispersed at low solids (less than 10%), and non-clay and abrasive particles separated, after which the slurry is screened and centrifuged to recover a less than 4 micron cut, all of which is in accord with prior art conventional procedures. At this point, however, the 4 micron cut is further diluted to facilitate separation (e.g. to 1-2% solids), and recentrifuged to reduce the average particle size from the first centrifuging by increasing the ratio of dispersed clay platelets to aggregated clay platelets. Thus, in a representative instance where the initial cut from a DeLaval continuous disc centrifuge had an average particle size of 1.1 microns, following the second centrifuging (at reduced solids) the average particle size was reduced to 0.5 microns. Additional passes through the centrifuge may be used to further reduce the average particle size and increase the ratio of dispersed to aggregated clay platelets. The resulting very fine-sized product is then subjected to the conventional reaction with the quaternary amine.

The subsequent reaction of the clays treated pursuant to the invention, with an amine, is effected by the conventional procedures described at great length in the prior art, including in the previously mentioned patents. The organic compounds which are reacted with the treated clay are quaternary ammonium salts, where the salt anion is preferably chloride or bromide or mixtures thereof; and is more preferably chloride ion. The salt anion may also, however, be nitrate, hydroxyl, acetate, or mixtures of these. Any of such compounds as are known to be useful in producing organoclay gellants of the type herein discussed may be used in this aspect of the invention, specifically including the compounds so reported useful in the patents heretofore cited. Among others these include dimethyl di(hydrogenated tallow), dimethyl benzyl hydrogenated tallow, dibenzyl dialkyl, methyl benzyl dialkyl, and trimethyl hydrogenated tallow salts.

Pursuant to the improvements yielded by the invention, the gelling characteristics i.e. the gelling efficiency of the clays treated by the invention, are so markedly enhanced, as to make possible use of quantities of the gelling agent to achieve a given result, which are reduced in comparison to the amount which would be required in the absence of the invention. Further clays, such as certain deposits of bentonite-type clays which heretofore had been considered unacceptable as crude materials for use in preparing suitable gellants, are found when treated by the process of the invention, to yield organoclay gelling agents which are fully acceptable for use in gelling organic liquids or the like. A net effect of the invention in this regard, is therefore to enable highly effective use of crude deposits previously deemed usable for these purposes, thereby vastly expanding the possible sources of raw materials which can be used to produce the final gellant products.

DESCRIPTION OF PREFERRED EMBODIMENTS

The invention will now be illustrated by a series of Examples, which are intended to set forth typical and preferred procedures to be utilized in practice of the process of the invention, but which are not deemed to be delimitive of the invention otherwise disclosed and claimed.

EXAMPLE I

In this Example, the smectite-type clay utilized as a starting material was a Wyoming bentonite. The crude bentonite was initially dispersed in water at 7% solids by weight. The slurry was thereupon screened, and then centrifuged to remove non-clay components and especially abrasive elements such as quartz. The fine fraction from the centrifuge, which then included approximately 4 to 5% solids by weight, was divided into two portions. One such portion served as a control sample. The second portion, in accordance with the invention, was passed through a Manton-Gaulin homogenizer, wherein pressures of 5000 psig. were maintained across the gap of the said apparatus. The control and the sheared samples, were each divided into further portions, which were reacted with the salt of a dimethyl di(hydrogenated tallow) amine. The ratio of amine to clay was varied in the samples from 85 to 105 milliequivalents per 100 grams of clay on a 100% active clay basis. The amine was stirred into the approximately 4 to 5% solids slurry at 60° C., with stirring being continued for approximately ½ hour, after which the material was filtered, washed with water and dried at 60° C. The dried material was pulverized with a Mikropul mill to approximately 95% less than 200 mesh. Tests were then conducted to determine the gelling properties of each of the control and invention samples.

Figure 1:
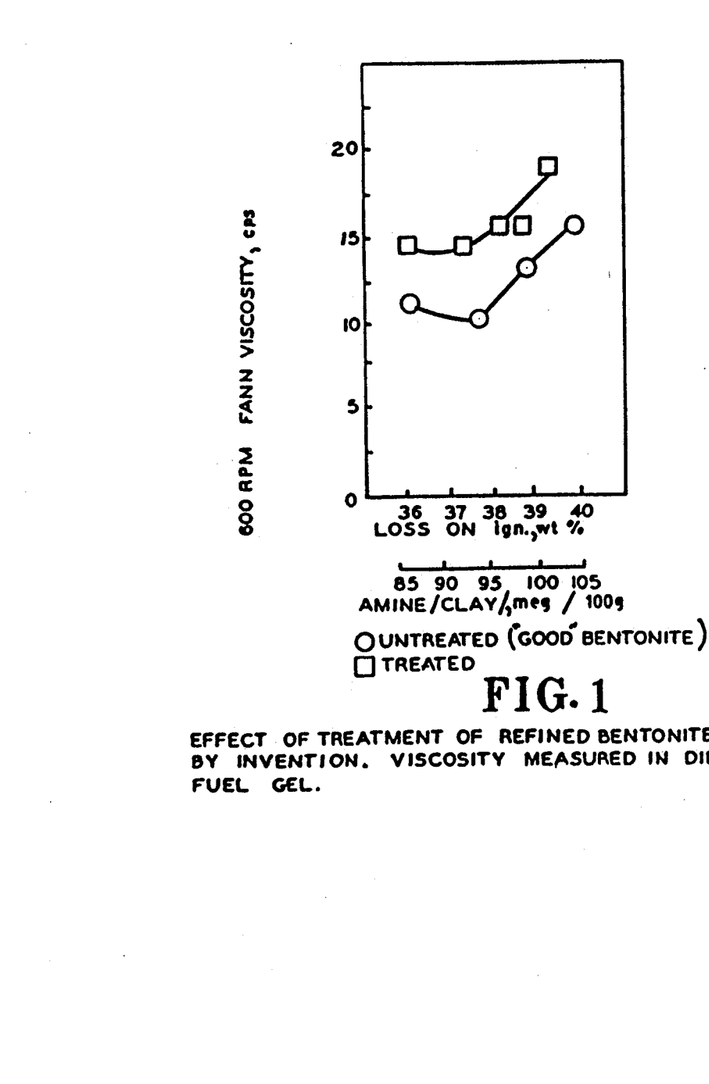
FIG. 1 is a graph comparing the effects of gelling a diesel fuel with an organoclay prepared by the process of the invention, with an organoclay which has been conventionally processed.

In FIG. 1 herein, Fann viscosity in cps is plotted as a function of milliequivalents of the amine added to the clay for the untreated bentonite samples, i.e., the prior art samples, and for the sample treated in accordance with the invention. (Loss on ignition is also plotted as abscissa, which is a measure of the organics combined with the clay). The type of bentonite utilized in this example is considered by those skilled in the art to be relatively "good" for use in preparing organoclay gellants. Viscosity measurements were effected by measuring a quantity of diesel oil into a multi-mixer can. In each instance, the sample to be evaluated was added to the diesel oil with stirring, after which water was stirred into the mix, the can removed from the mixer, and placed on the Fann viscometer, and the 600 and 300 rpm readings obtained. Gel readings were obtained after 10 seconds. It will be apparent that a vast improvement in viscosity of the gelled diesel fuel is evidenced across all ranges of the amine-to-clay ratio where the method of the invention is used.

EXAMPLE II

Figure 2:
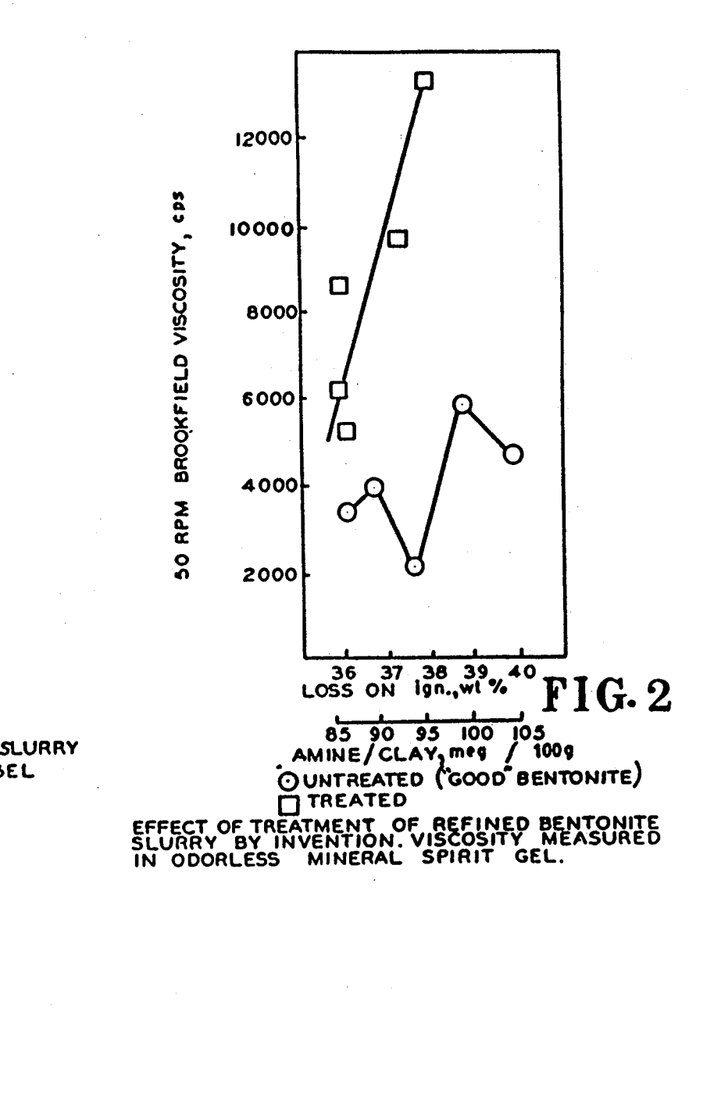
FIG. 2 is a graph similar to FIG. 1 and illustrating the comparative results achieved where an organoclay in accordance with the invention, and a control untreated organoclay, are each used in the gelling of odorless mineral spirits.

In this instance, the same procedure was utilized as in Example I, except that the effect of the invention on the gellant were evaluated by admixing same with odorless mineral spirits (OMS). In the said procedure, a fixed quantity of the odorless mineral spirits were transferred to a container and the temperature is established for same. A small quantity of 100% propylene carbonate was added to the mixture, while stirring. Next, a specified quantity of the sample to be evaluated was transferred to the container, followed by vigorous stirring. The mixture was blunged with a Cowles blade for two minutes and the gel stirred for 10 revolutions with a spatula. The container was covered and the gel allowed to remain in a constant temperature bath at 24° C., + or −1° C. for two hours, after which the gel viscosity was measured on a Brookfield viscometer. The resulting data is plotted in FIG. 2, and establishes even a more remarkable difference between the treated and untreated organoclays with respect to their ability to gel the said odorless mineral spirits.

EXAMPLE III

Figure 3:
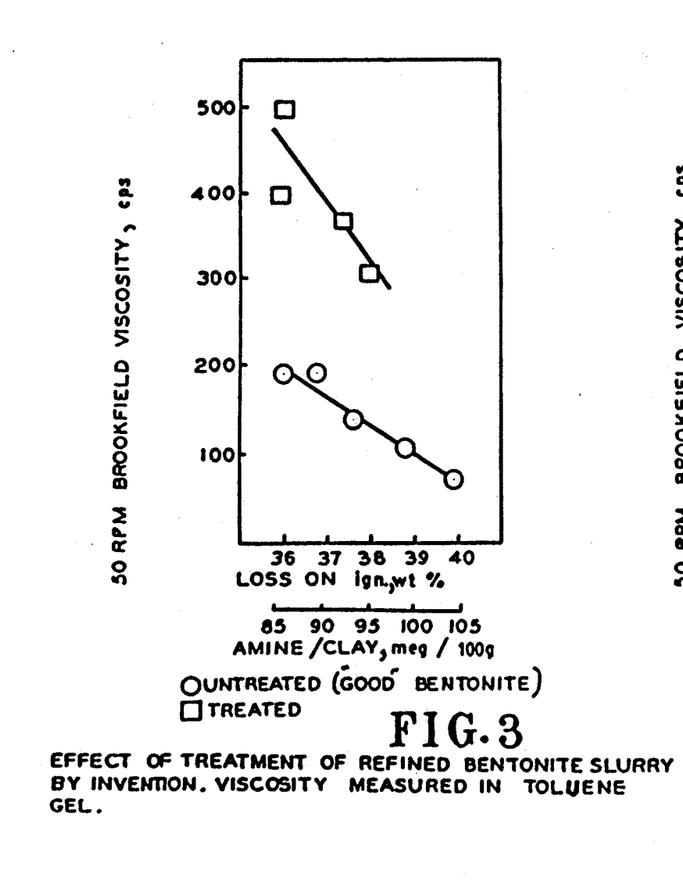
FIG. 3 is a further graph similar to the foregoing graphs, and illustrating comparable data for a toluene gel.

In FIG. 3, the same material as in Examples I and II, resulting from the present invention is evaluated for its gelling characteristics in toluene. In this procedure, 6 grams of the organoclay was admixed with 340 ml of toluene by use of gellant, whereas the organoclay yielded by the process of the invention is a completely acceptable product.

EXAMPLE V

Figures 5, 6, 7:
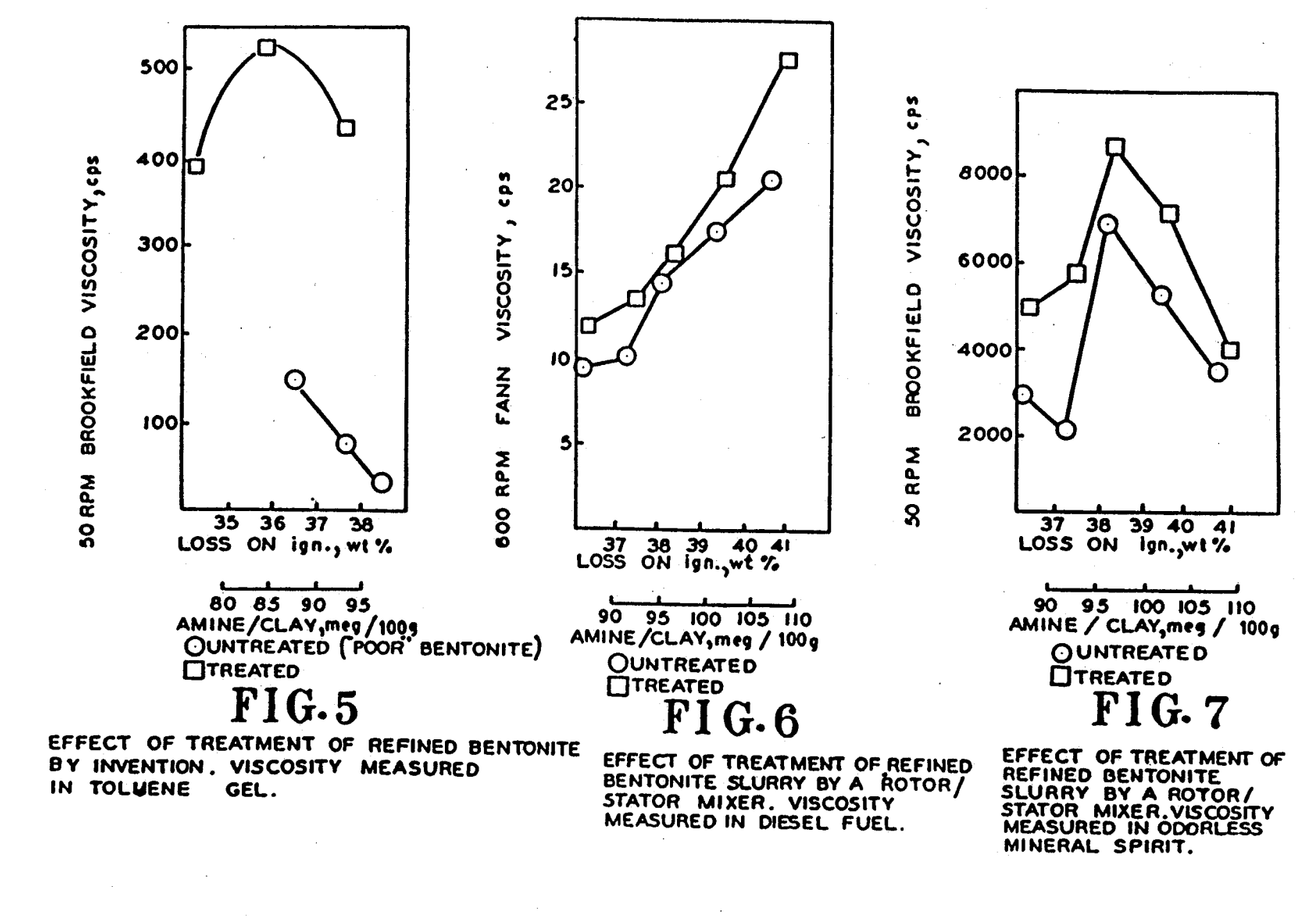
FIG. 5 is a graph of the same character as in FIG. 4, but illustrating comparative data for viscosity measurements of a toluene gel.
FIG. 6 is a further graph illustrating test data for a gelled diesel fuel as in prior Figures, except in this instance a further type of high speed fluid shearing is effected.
FIG. 7 is similar to FIG. 6, but shows the gelling improvement achieved in odorless mineral spirits through use of shearing as in the data for FIG. 6.

In this Example, a further so-called "poor" bentonite was processed in accordance with the invention and in accordance with prior art, and the effects upon gelling of toluene were established by the procedures of Example III. The graphical showing of FIG. 5 illustrates the same consequences, as discussed for Example IV; i.e., that by the process of the invention, a remarkable improvement in the gelling properties of an otherwise poor bentonite have been achieved, resulting in a highly usable material in place of a material which heretofore was unacceptable for preparation of organoclays intended for use as gelling agents.

EXAMPLE VI

In this Example, samples of a further refined bentonite slurry which was initially processed as described in connection with Example I, was subjected to high speed fluid shear by being passed through a Greer mixer, which is a well-known dispersion mill of the rotor/stator type. In this procedure, the slurry was mixed with the Greer for a minimum of 5 minutes at maximum speed, 8500 rpm. Directly after mixing, the amine was added in the normal manner. The comparative data yielded depicts gelling a Waring blender. 2.3 ml of a polar dispersant was then added, consisting of 95% by weight methanol and 5% by weight of deionized water, and additional blending carried out. (In general, small proportions of polar compounds may be added to develop maximum viscosity. Typical polar activators are water, methanol, and propylene carbonate). The contents were then poured into a container, allowing the gel to flow very thinly over the container lip, thus allowing any air bubbles to escape. The container was maintained in a water bath at 74° + or −1° F., for two hours, after which Brookfield viscosity readings were obtained. Once again, FIG. 3 illustrates the striking improvements yielded by practice of the invention.

EXAMPLE IV

Figure 4:
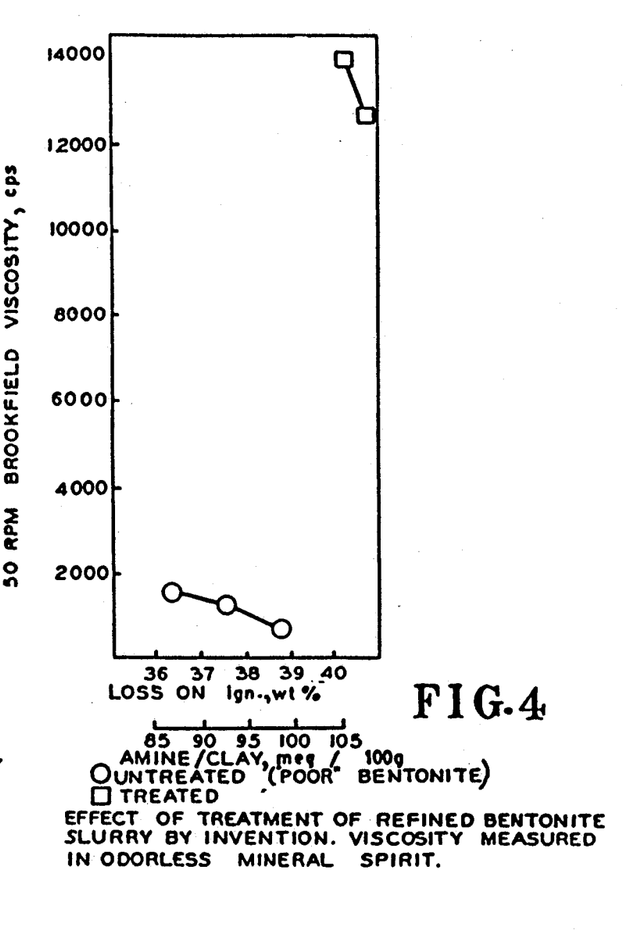
FIG. 4 is a further graph of the same character as the prior graphs, illustrating gelling effects in a further odorless mineral spirits, where the starting crude clay is of relatively poor quality.

In this Example, the same procedure was utilized as in Example I for purposes of preparing the modified bentonite, except the bentonite sample utilized herein differed from that in Example I in being a crude of a type normally regarded as "poor" for producing an organoclay gelling agent. The same procedures as aforementioned were used in treating odorless mineral spirits. The data yielded is set forth in FIG. 4. It is clear that the process of the invention has yielded a remarkable increase in gelling capacity for the material treated by the invention. Indeed, as mentioned, the said bentonite crude would, where processed by conventional techniques, be regarded as an unacceptable effects in a diesel fuel for samples treated by the invention, vis-a-vis samples conventionally processed. These show a good improvement where the process of the invention is utilized, although the improvement is not so marked as that yielded where the Manton-Gaulin type of mill is used.

EXAMPLE VII

In this Example, the procedure described in Example VI was followed, except that the resulting samples were evaluated for use in gelling odorless mineral spirits. The resultant data is set forth in FIG. 6. Again, it is seen that the process of the invention results in marked improvements, although these again are not so striking as those yielded where the slurry is passed through the Manton-Gaulin type of processing.

Passage of the clay slurry through a narrow pressurized gap in accordance with the invention yields results that differ fundamentally from what occurs where a conventional blade or disc-type mixer such as a Waring Blender or a Cowles disperser is utilized. This can be appreciated by comparing the shearing mechanisms imposed upon a fluid in a Cowles high speed disperser with those imposed by the Manton-Gaulin mill.

In the Cowles high speed dissolver shear is imposed upon a fluid by smashing actions of the blades (mechanical energy) and by smearing arising from laminar flow. Of the two, the smearing mechanism is the more important, and the efficiency of dispersion is determined by the stirring design configuration (RPM, blade size, container size and shape). Swirling, turbulent flow creates efficient mixing but most significantly, intermingled pockets remain undispersed. Conversely, the laminar flow pattern may fail to provide efficient mixing, but the drag of layers over each other tears any clumps of particles apart, and efficient dispersion is obtained. Additionally, the more viscous the fluid, the more effective is the tearing, and the efficiency of the Cowles disperser increases with increasing viscosity.

In contrast, the Manton-Gaulin mill allows the product to enter an expansion valve at a very high pressure and low velocity. As the product enters the close clearance area between the valve and the valve seat there is a rapid increase in velocity to the order of 30,000 cm/sec with a corresponding decrease in pressure arising from the Bernoulli effect. This allows the formation of bubbles which implode with extreme energy as the product velocity decreases upon leaving the valve seat area. This promotes the creation of shock waves which induce shearing by collision; this process is known as cavitation. In contrast to the behavior of the Cowles apparatus, the efficiency of the Manton-Gaulin mill decreases with increasing viscosity arising from rapid dissipation of shear waves.

It can be shown that the shear stress in a typical Cowles dissolver is approximately 2013 dynes/cm$^2$. (This assumes a fluid density of 1.0 g/cm$^3$ and a circular rim blade velocity of 4000 ft/min (2000 cm/sec) for a dissolver with a 4 inch blade.

Although the Manton-Gaulin mill does not employ laminar flow as a shearing mechanism, assuming a laminar model may give an upper bound to the shear rate and shear stresses encountered upon cavitation. Because of the extreme pressure shearing of the order of magnitude of laminar stress may be encountered.

Assuming this and a reasonable distance between the valve and valve seat (100 microns) a shear rate may be estimated from manufacturer specifications as about $2.9 \times 10^6$ sec$^{-1}$. The shear stress can then be shown to be $8.8 \times 10^7$ dynes cm$^{-2}$.

From the foregoing it may be concluded that the following differences exist between the Cowles and Manton-Gaulin devices:

1. The Manton-Gaulin mill operates on the principle of cavitation involving extremely high particle velocities and turbulent flow. The Cowles apparatus operates at low shear rates with efficient dispersion arising from laminar flow.

2. The efficiency of the Cowles disperser increases with increasing viscosity; that of the Gaulin apparatus decreases.

3. Clay particles in suspension experience much higher shear stresses and shear rates in the Gaulin apparatus, although these are not amenable to direct calculation.

4. In order to compare the total shear exerted upon a clay slurry per unit area, time integrals must be compared. Assuming the Gaulin apparatus has a pump stroke of 1800 RPM (.03 sec/stroke) the total shear time values can be estimated, and indicate that a 35 minute shear in the Cowles device typically equates to one pump stroke on the Manton-Gaulin apparatus insofar as total shear is concerned.

EXAMPLE VIII

In this Example, the smectite-type clay utilized as a starting material was a Wyoming bentonite. The crude bentonite was adjusted with water to approximately 60 to 75% solids, and was then passed through a pugmill of the type disclosed in the aforementioned U.S. Pat. No. 3,574,345. The mill had an L/D ratio of about 7.5:1. Approximately 40 to 50 HP-hr/ton of dry clay of energy was imparted to the materials. The pugged bentonite was thereupon dispersed in water at 7% solids by weight. The slurry was thereupon screened, and then centrifuged to remove non-clay components, including abrasive elements such as quartz. The fine fraction from the centrifuge then included approximately 4 to 5% solids by weight. The treated samples were divided into further portions which were reacted with the salt of a dimethyl di(hydrogenated tallow) amine. The ratio of amine to clay was varied in the samples from 85 to 105 milliequivalents per 100 grams of clay on a 100% active clay basis. The amine was stirred into the approximately 4 to 5% solids slurry at 60° C., with stirring being continued for approximately ½ hour, after which the material was filtered, washed with water and dried at 60° C. The dried material was pulverized with a Mikropul mill to approximately 95% less than 200 mesh. Tests were then conducted to determine the gelling properties of each of the invention samples.

Figures 8, 9, 10:
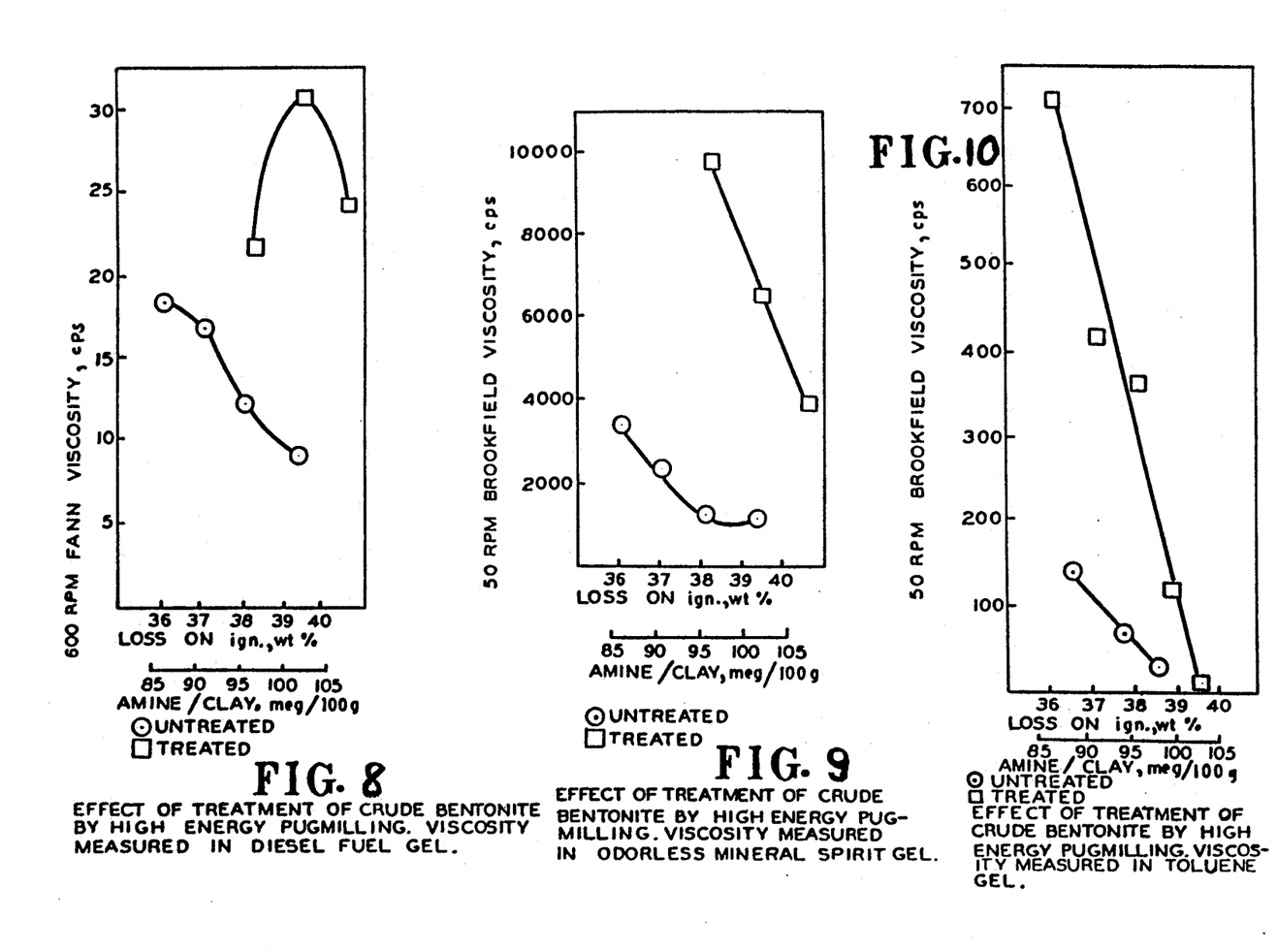
FIG. 8 is a graph comparing the effects of gelling a diesel fuel with an organoclay prepared from a bentonite slurry prepared by an alternative embodiment of the process of the invention, with an organoclay prepared from bentonite slurry which has been conventionally processed.
FIG. 9 is a graph similar to FIG. 8 and illustrating the comparative results achieved where an organoclay in accordance with the invention, and a control untreated clay, are each used in the gelling of odorless mineral spirits.
FIG. 10 is a further graph similar to the foregoing graphs, and illustrating comparable data for a toluene gel.

In FIG. 8 herein, Fann viscosity in cps is plotted as a function of milliequivalents of the amine added to the clay for untreated bentonite samples, i.e., the prior art samples, and for the sample treated in accordance with the invention. (Loss on ignition is also plotted as abscissa, which is a measure of the organics combined with the clay). The type of bentonite utilized in this example is considered by those skilled in the art to be relatively "good" for use in preparing organoclay gellants. Viscosity measurements were effected by measuring a quantity of diesel oil into a multi-mixer can. In each instance, the sample to be evaluated was added to the diesel oil with stirring, after which water was stirred into the mix, the can removed from the mixer, and placed on the Fann viscometer, and the 600, and 300 rpm readings obtained. Gel readings were obtained after 10 seconds. It will be apparent that a vast improvement in viscosity of the gelled diesel fuel is evidenced across all ranges of the amine-to-clay ratio where the method of the invention is used.

EXAMPLE IX

In this instance, the same procedure was utilized as in Example VIII, except that the effect of the invention on the gellant were evaluated by admixing same with odorless mineral spirits (OMS). In the said procedure, a fixed quantity of the odorless mineral spirits were transferred to a container and the temperature is established for same. A small quantity of 100% propylene carbonate was added to the mixture, while stirring. Next, a specified quantity of the sample to be evaluated was transferred to the container, followed by vigorous stirring. The mixture was blunged with a Cowles blade for two minutes and the gel stirred for 10 revolutions with a spatula. The container was covered and the gel allowed to remain in a constant temperature bath at 24° C., + or −1° C. for two hours, after which the gel viscosity was measured on a Brookfield viscometer. The resulting data is plotted in FIG. 9, and establishes even a more remarkable difference between the treated and untreated organoclays with respect to their ability to gel the said odorless mineral spirits.

EXAMPLE X

In FIG. 10, a similar material to that used in Examples VIII and IX, resulting from the present invention, is evaluated for its gelling characteristics in toluene. In this procedure, 6 grams of the organoclay was admixed with 340 ml of toluene by use of a Waring blender. 2.3 ml of a polar dispersant was then added, consisting of 95% by weight methanol and 5% by weight of deionized water, and additional blending carried out. (In general, small proportions of polar compounds may be added to develop maximum viscosity. Typical polar activators are water, methanol, and propylene carbonate). The contents were then poured into a container, allowing the gel to flow very thinly over the container lip, thus allowing any air bubbles to escape. The container was maintained in a water bath at 74° + or −1° F., for two hours, after which Brookfield viscosity readings were obtained. Once again, FIG. 10 illustrates the striking improvements yielded by practice of the invention.

EXAMPLE XI

In this Example, the gelling efficiencies of a series of organoclays were evaluated in toluene, for instances wherein the starting crude bentonites (Wyoming bentonite—predominantly a sodium bentonite) had been subjected to various, differing processing. Specifically, the bentonite samples were processed (a) by conventional procedures as in Example I to yield controls; (b) by high energy pugmilling as in Example VII; (c) by high speed fluid shear in a Manton-Gaulin Mill, as in Example I; (c) by subjecting the fine fraction from the centrifuge (see Example I), which was substantially a sub-4 micron cut, to dilution to 1% solids and to recentrifuging in a DeLaval continuous disc centrifuge to recover a further reduced average particle size fraction of clay; and (d) subjecting the fine fraction slurry from centrifuging (see Example I) to sand grinding. The treated clay products were then reacted with a dimethyl di(hydrogenated tallow) amine as in Example I, and then tested for gelling properties in toluene by the procedure of Example III. The results are set forth in Table I below, which indicates not only the effects upon gelling, but also work input provided to each bentonite sample by the specified treatment, loss on ignition (LOI), and the average particle size for the treated clay which is then reacted with the amine. The LOI is desirably the same for each sample in order to assure that degree of treatment with the amine is comparable. The LOI figure at the top of Table I indicates the range within the samples.

The particle size analysis was effected with a Malvern Photon Correlation Spectrometer. The average particle size values are based on the particle size below which 50% of the weight exists. The particle size values are based on equivalent spherical diameters.

Figure 11:
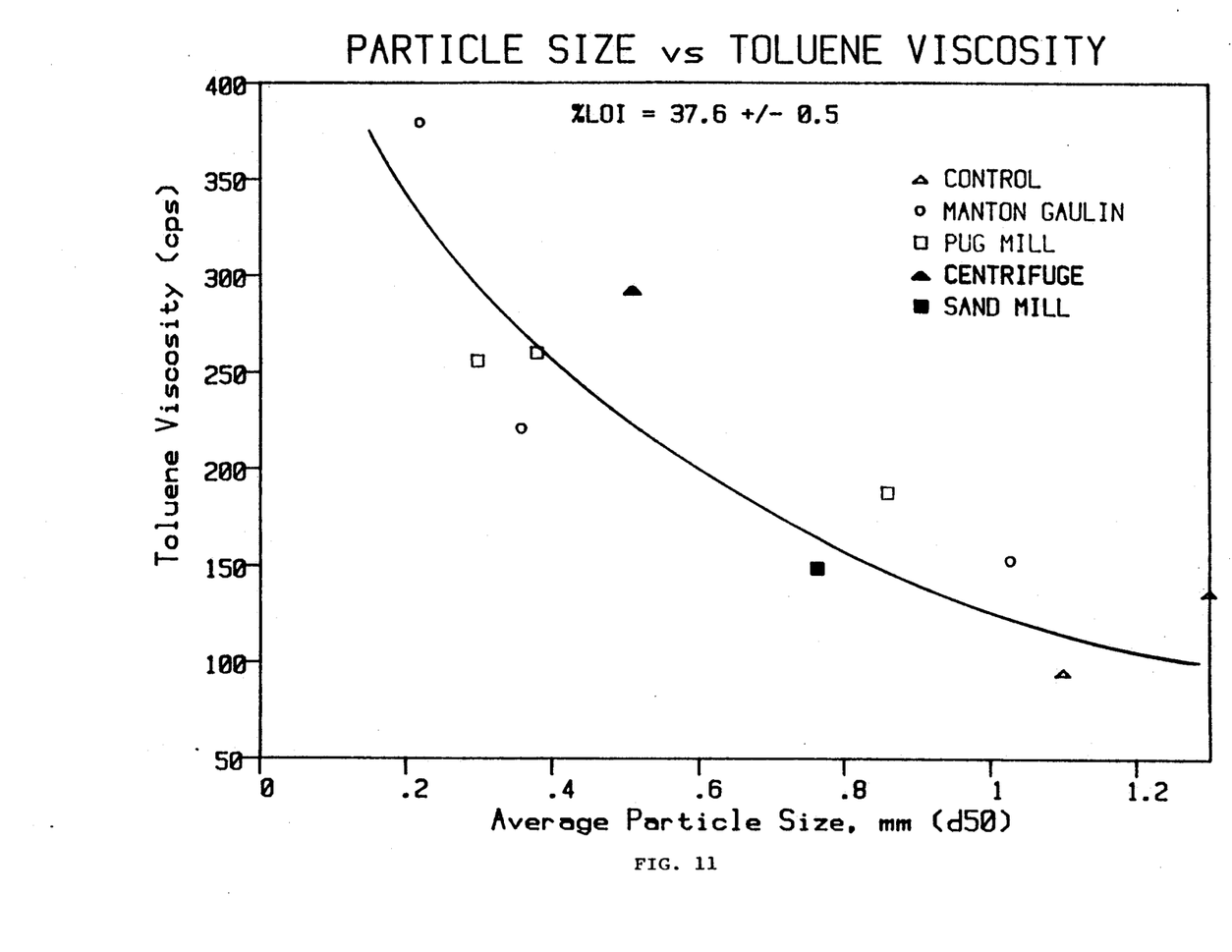
FIGS. 11, 12 and 13 are further graphs similar to the preceding graphs, and illustrating comparative results achieved in gelling respectively toluene, odorless mineral spirits, and diesel fuel, by use of organoclays prepared from control clays and from clays processed in accordance with various embodiments of the invention.

The data from Table I is plotted in FIG. 11, which correlates gelling effects in toluene with the average particle size achieved by practice of the methods of the invention. The striking improvements in gelling efficiencies achieved are evident.

TABLE I

| | TOLUENE % LOI 37.6 ± 0.5 | | | |
|---|---|---|---|---|
| WORK INPUT (HP-HR/TON) | PROCESS | LOI | d50 (microns) | VISCOSITY (cps) |
| — | Control | 37.5 | 1.3 | 136 |
| — | Control | 38.0 | 1.1 | 96 |
| 30 | Pug[1] | 37.3 | 0.86 | 188 |
| 100 | Pug | 37.2 | 0.38 | 260 |
| 126 | Pug | 37.8 | 0.30 | 256 |
| 63 | M G[2] | 38.1 | 1.03 | 152 |
| 250 | M G[2] | 37.9 | 0.36 | 220 |
| 750 | M G[2] | 37.8 | 0.22 | 380 |
| — | Centrifuge | 37.2 | 0.51 | 292 |

TABLE I-continued

| | | | | |
|---|---|---|---|---|
| 342 | Sand Mill | 37.0 | 0.76 | 143 |

[1,2] "MG" refers to Manton-Gaulin mill. The numbers of passes to generate the HP-HR/TON for the MG and pugmill are:

| HP-HR/TON | PROCESS | PASSES |
|---|---|---|
| 30 | Pug | 1 |
| 126 | Pug | 4 |
| — | MG | 1 pass @ 1000 psi |
| 250 | MG | 1 pass @ 4000 psi |
| 750 | MG | 3 passes @ 4000 psi |

EXAMPLE XII

Figure 12:
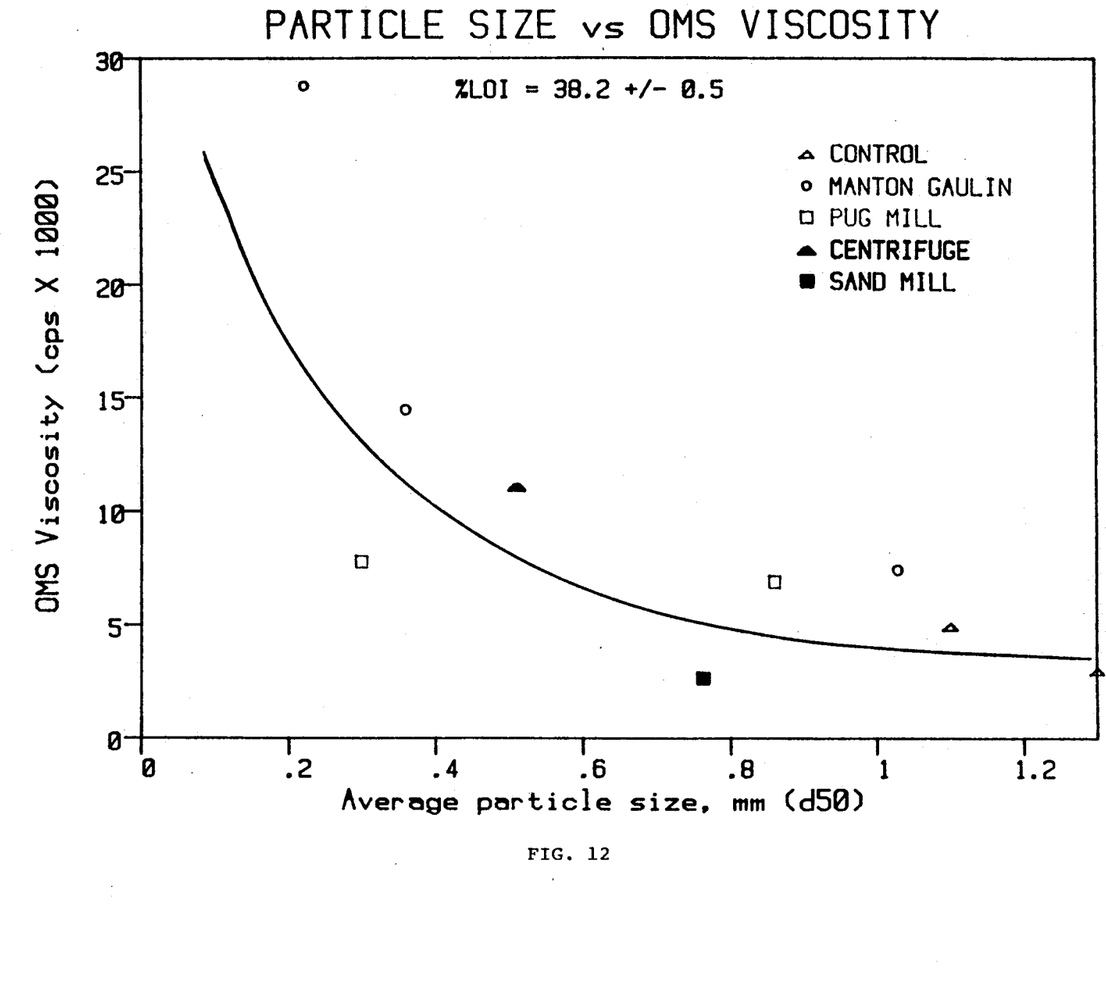

The procedures used in this Example are identical to these of Example XI, except that gelling efficiencies of the resultant organoclays were evaluated in odorless Mineral Spirits (OMS) by the procedure of Example II. Results are set forth in Table II, and in the graph of FIG. 12, where the data is tabulated and related as in Example XI.

TABLE II

OMS
% LOI 38.2 ± 0.5

| WORK-INPUT (HP-HR/TON) | PROCESS | LOI | d50 (microns) | VISCOSITY (cps) |
|---|---|---|---|---|
| — | Control | 38.4 | 1.3 | 2980 |
| — | Control | 38.0 | 1.1 | 4880 |
| 30 | Pug[1] | 38.4 | 0.86 | 6840 |
| 126 | Pug[1] | 38.7 | 0.30 | 7760 |
| 63 | M G[2] | 38.1 | 1.03 | 7480 |
| 250 | M G[2] | 37.9 | 0.36 | 14500 |
| 750 | M G[2] | 37.8 | 0.22 | 28800 |
| — | Centrifuge | 38.5 | 0.51 | 11100 |
| 342 | Sand Mill | 38.5 | 0.76 | 2640 |

[1,2] See footnotes in Table 1

EXAMPLE XIII

Figure 13:
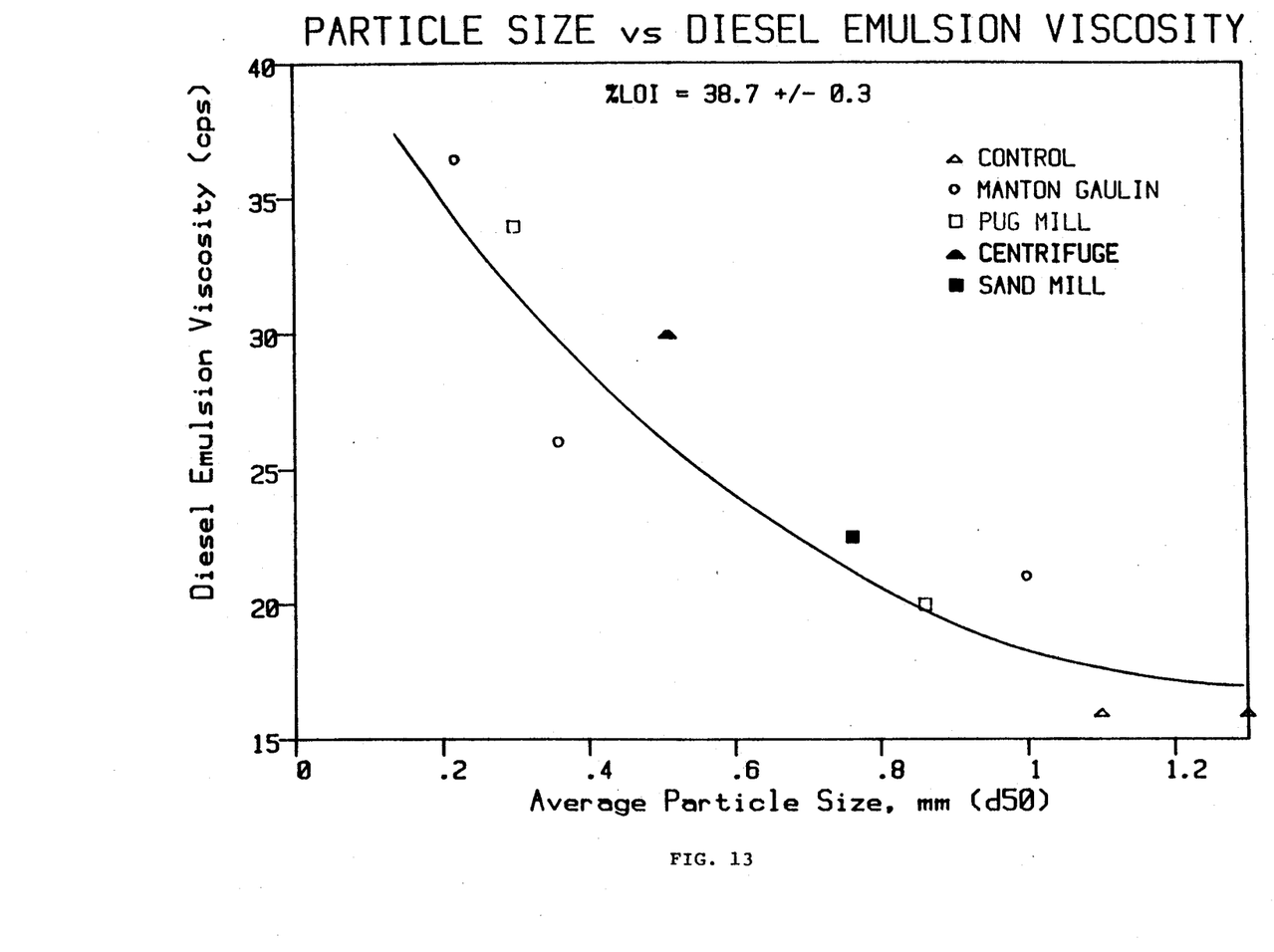

The procedures used in this Example are identical to those of Examples XI and XII, except that gelling efficiencies of the resultant organoclays were evaluated in diesel fuel by the procedure of Example I. Results are set forth in Table III, and in the graph of FIG. 13, where the data is tabulated and related as in Examples XI and XII.

TABLE III

DIESEL FUEL
% LOI 38.7 ± 0.3

| WORK INPUT (HP-HR/TON) | PROCESS | LOI | d50 (microns) | VISCOSITY OF DIESEL EMULSION (cps) |
|---|---|---|---|---|
| — | Control | 38.4 | 1.3 | 16 |
| — | Control | 39.0 | 1.1 | 16 |
| 30 | Pug[1] | 38.4 | 0.86 | 20 |
| 126 | Pug[1] | 38.7 | 0.30 | 34 |
| 63 | M G[2] | 38.7 | 1.0 | 21 |
| 250 | M G[2] | 38.9 | 0.36 | 26 |
| 750 | M G[2] | 38.8 | 0.22 | 36.5 |
| — | Centrifuge | 38.5 | 0.51 | 30 |
| 342 | Sand Mill | 38.5 | 0.76 | 22.5 |

[1,2] See footnotes in Table 1

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A process for preparing an organophilic clay gellant comprising:
    (a) subjecting a slurry of smectite-type clay having a cation exchange capacity of at least 75 milliequivalents per 100 grams of clay to high shear conditions achieved by passing the slurry at least one time through a Manton-Gaulin homogenizer whereby clay agglomerates are separated, said smectite-type clay having been previously treated to remove non-clay impurities;
    (b) reacting the smectite-type clay with organic cation whereby at least some of the cation exchange sites of the smectite-type clay are substituted with organic cation thereby forming an organophilic clay gellant;
    (c) separating the organophilic clay gellant; and
    (d) drying the organophilic clay gellant.

2. The process of claim 1 in which the high shear conditions are achieved by passing the slurry at least one time through a Manton-Gaulin homogenizer operating at from 1000 to 8000 psig.

3. The process of claim 2 in which the sheared clay exhibits a reduction in median particle size of from about 42 to about 53% when compared to unsheared clay.

* * * * *